(No Model.)
J. KIBIN.
PULLEY OR SHEAVE.
No. 597,063. Patented Jan. 11, 1898.
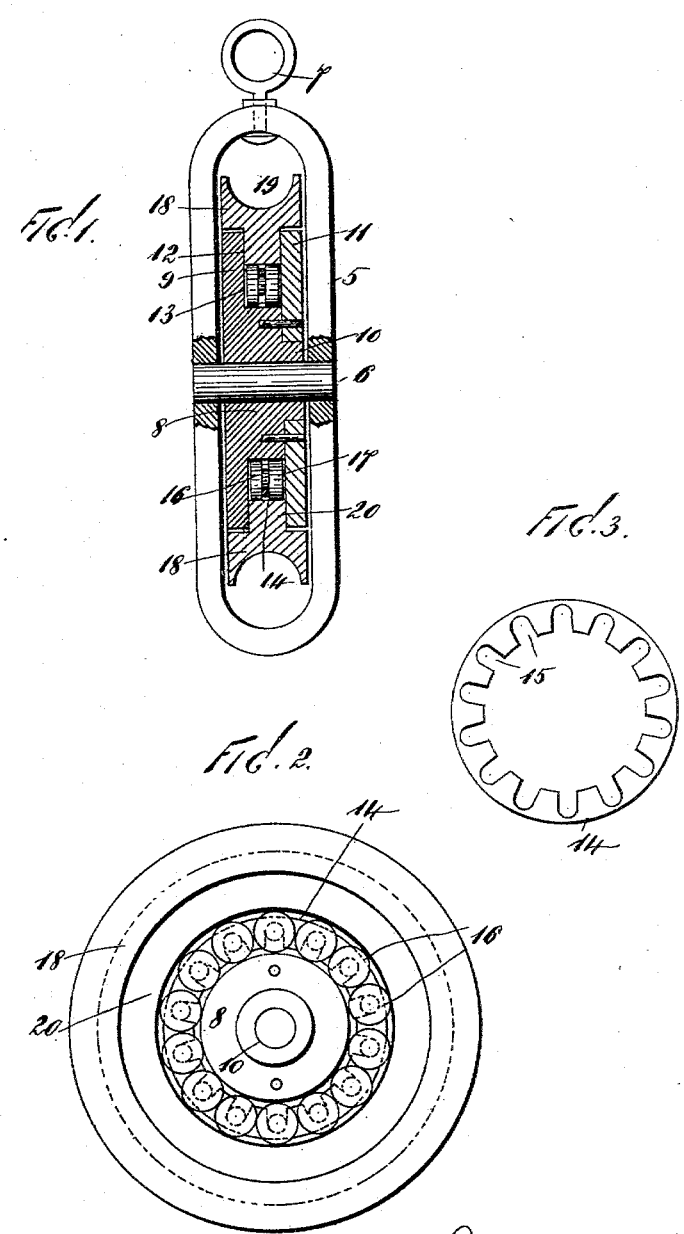
WITNESSES:
John Buckler
C. Gersh
INVENTOR
John Kibin.
BY
Edgar Tate & Co
ATTORNEYS.

UNITED STATES PATENT OFFICE.

JOHN KIBIN, OF NEW YORK, N. Y.

PULLEY OR SHEAVE.

SPECIFICATION forming part of Letters Patent No. 597,063, dated January 11, 1898.

Application filed May 13, 1897. Serial No. 636,351. (No model.)

*To all whom it may concern:*

Be it known that I, JOHN KIBIN, a citizen of the United States, residing at New York, in the county of New York and State of New York, have invented certain new and useful Improvements in Pulleys or Sheaves, of which the following is a full and complete specification, such as will enable those skilled in the art to which it appertains to make and use the same.

This invention relates to pulley-blocks; and the object thereof is to provide an improved antifriction pulley block or sheave which is simple in construction and operation and which consists of separate concentric parts mounted upon and revoluble on a shaft, the outer part being also revoluble on the inner part and said parts being separated by roller-bearings of novel form and construction.

The invention is fully disclosed in the following specification, of which the accompanying drawings form a part, in which—

Figure 1 is a transverse section of my improved pulley block or sheave and showing the frame in which it is mounted; Fig. 2, a side view of the pulley block or sheave with a portion thereof removed; and Fig. 3 is a side view of a detail of the construction.

In the drawings forming part of this specification the separate parts of my improvement are designated by the same numerals of reference in each of the views, and in the practice of my invention I provide a pulley block or sheave which is mounted in a frame 5, which is provided centrally with a shaft 6 and at one side thereof with a hook, ring, or eye 7, these parts being of the usual construction. I also provide a pulley block or sheave which consists of a central hub 8, which is revoluble on the shaft 6, and which is provided at one side with an annular flange or rim 9 and at the opposite side with a reduced extension 10, and bolted to or otherwise secured to the hub 8 is an annular plate 11, which is similar in form to the flange or rim 9. As thus constructed, a deep angular groove 12 is formed between the outer edges of the flange or rim 9 and the annular plate 11, and in practice I provide a roller-bearing 13, which is mounted in said groove and which moves upon the hub 8.

In constructing the roller-bearing 13 I provide a flat ring 14, a side view of which is given in Fig. 3, and the inner edge of which is provided with a plurality of U-shaped notches or recesses 15, and I also provide a plurality of rollers 16, each of which is provided centrally with an annular groove 17, and these rollers are connected with the ring 14, as shown in Fig. 2, said rollers being set into said ring and the side walls of the U-shaped notches or recesses 15 enter the annular grooves 17. The diameter of the rollers 16 is slightly greater than the width of the ring 14, and when these parts are placed in position, as shown in Figs. 1 and 2, the rollers bear on the hub 8, and the outer perimeter of the ring 14 is within the outer surface of said rollers. I also provide a revoluble rim 18, which is provided in its periphery with an annular groove 19 and on the inner side thereof with an inwardly-directed annular flange 20, and this flange 20 enters the space between the flange or rim 9 of the hub 8 and the annular plate 11, which is secured thereto, and said flange rests upon the rollers 16 and is adapted to revolve or turn thereon.

The parts are assembled by first placing the rollers in the ring 14, then placing said ring in position, then placing the rim 18 in position, and then securing the annular plate 11 to the hub 8.

It will be understood that the frame 5 of the pulley or sheave may be constructed in any desired manner, and may be composed of any desired number of parts, and when the separate parts of my improved pulley or sheave are connected as described the hub 8 revolves on the shaft 6, the roller-bearing on the hub 8, and the rim 18 on the roller-bearing, and by means of this construction I reduce the friction to a minimum and prevent the jamming or locking of the separate parts of the sheave or pulley, an objection common to most antifriction pulleys or sheaves as usually constructed.

Having fully described my invention, I claim as new and desire to secure by Letters Patent—

The herein-described pulley or sheave comprising a frame 5, shaft 6, hook or ring 7, a hub 8 revoluble on said shaft 6 and provided at one side with an annular flange or rim 9, and at the opposite side with a reduced extension 10, an annular plate 11 secured to the said hub 8, and which is similar in form to the said flange or rim 9 whereby a deep annular groove 12 is formed which is angular in form in cross-section, a roller-bearing 13 mounted in said grooves consisting of a flat ring 14, having a plurality of U-shaped notches or recesses 15 formed on the inner edge thereof, a plurality of rollers 16 each of which is provided centrally with an annular groove 17, and said rollers being set into said ring and the side wall of the U-shaped notches or recesses 15 being adapted to enter said annular groove 17, the diameter of the said rollers being slightly greater than the width of the ring 14 whereby the rollers bear on the said hub 8, and the outer perimeter of the ring 14, is within the upper surface of said rollers, a revoluble rim 18 provided on its periphery with an annular groove 19 and on the inner side thereof with an inwardly-directed annular flange 20 adapted to enter the said groove 12, and to revolve thereon, substantially as and for the purpose described.

In testimony that I claim the foregoing as my invention I have signed my name, in presence of the subscribing witnesses, this 11th day of May, 1897.

JOHN KIBIN.

Witnesses:
C. GERST,
A. C. VAN BLARCOM.